United States Patent
Boveja et al.

(10) Patent No.: US 6,771,186 B1
(45) Date of Patent: Aug. 3, 2004

(54) WIRELESS REMOTE CONTROL OF SYSTEMS FOR COUNTERING HOSTILE ACTIVITY ABOARD AN AIRPLANE

(76) Inventors: Birinder R. Boveja, P.O. Box 210095, Milwaukee, WI (US) 53221; Angely Widhany, P.O. Box 210095, Milwaukee, WI (US) 53221

(*) Notice: Subject to any disclaimer, the term of this patent is extended or adjusted under 35 U.S.C. 154(b) by 80 days.

(21) Appl. No.: 10/007,302

(22) Filed: Oct. 22, 2001

(51) Int. Cl.[7] .............................................. G08B 21/00
(52) U.S. Cl. ..................... 340/945; 244/118.5; 713/200
(58) Field of Search ................................ 340/945, 963, 340/506, 539; 701/14, 3, 9; 455/431, 98; 244/118.5, 118.6

(56) References Cited

U.S. PATENT DOCUMENTS

| | | | | |
|---|---|---|---|---|
| 3,680,499 A | * | 8/1972 | Boudreau | 109/32 |
| 4,062,303 A | | 12/1977 | Fegley | 109/20 |
| 4,112,818 A | * | 9/1978 | Garehime, Jr. | |
| 4,841,752 A | | 6/1989 | Fletcher | 109/20 |
| 5,182,541 A | * | 1/1993 | Bajorek et al. | 340/428 |
| 5,531,402 A | * | 7/1996 | Dahl | 244/75 R |
| 5,655,461 A | | 8/1997 | Gilbert | 109/20 |
| 5,703,563 A | * | 12/1997 | Abe, Jr. | 340/426 |
| 5,796,330 A | | 8/1998 | Vinette | 340/426 |
| 5,803,359 A | | 9/1998 | Vandoninck | 239/2.1 |
| 6,253,064 B1 | * | 6/2001 | Monroe | 455/66 |
| 6,385,513 B1 | * | 5/2002 | Murray et al. | 701/14 |
| 6,431,044 B2 | * | 8/2002 | Poole | 89/1.11 |
| 6,499,693 B1 | * | 12/2002 | Rogson | 244/118.5 |
| 6,584,383 B2 | * | 6/2003 | Pippenger | 701/3 |

* cited by examiner

Primary Examiner—Brent A. Swarthout (57) ABSTRACT

A method of countering terrorism or hostile activity in an airplane by using a multitude of built-in systems within the aircraft. The built-in systems includes chemical sprays, laser guns, and pre-programmed sound alarm systems. The aerosol chemicals range from benign fogging agents to non-lethal incapacitating agents from the categories of inhalants, general anesthetics, and irritants. Any of the systems can be used singly or in any combination. These systems can be activated manually from the control panel in the cockpit, or via a remote wireless activation system by the flight crew from anywhere within the plane. Such activation being password and code protected.

9 Claims, 11 Drawing Sheets

WIRELESS REMOTE CONTROL OF SYSTEMS FOR COUNTERING HOSTILE ACTIVITY ABOARD AN AIRPLANE

FIELD OF INVENTION

This invention relates generally to anti-hijacking defense system, more specifically to method and systems for countering hijacking attempts by activating chemical spray systems, laser guns, and alarm systems incorporated within the airline, and wireless remote control of these systems.

This application is related to a co-pending application filed on Oct. 22, 2001, entitled METHOD AND SYSTEM FOR COUNTERING HOSTILE ACTIVITY ABOARD AN AIRPLANE.

BACKGROUND

Airline security measures have been applied to a large extent at the ground level. Some of the tools that have been used are to have the passengers pass through metal detectors, carry-on baggage being screened via x-ray equipment, and random checks on selected baggage for analysis of trace chemicals. The events which occurred in the United States, on Sep. 11, 2001 namely the hijackers taking control of the aircraft and purposely slamming the airliners into World Trade Towers and the Pentagon, obviate the need for more drastic security measures aboard the commercial airliners. This patent application is directed to system and method for countering/foiling hostile activity an airplane and is intended to be used in conjunction with other security methods already in use, such as having plain cloths security marshals aboard the airliners.

Prior art is generally directed to robbery deterrent systems or anti-carjacking devices. U.S. Pat. No. 5,655,461 (Gilbert) is directed to robbery deterrent system for convenience stores. In the system of the Gilbert patent, aerosol incapacitating agent is delivered immediately upon the detection of a firearm discharge, or in response to an employee activated trigger.

U.S. Pat. No. 4,062,303 (Fegely) is directed to anti-burglar booby trap device. In the Fegly patent, a pressurized container is moveably mounted in the anti-burglar device between an actuatable position and an inactuatable position. When the pressurized container is in the actuatable position, opening a door or a window will cause the device to discharge fluid from the pressurized container. In the inactuatable position, the anti-burglar device will permit the door or window to be opened without causing the device to discharge.

U.S. Pat. No. 5,803,359 (Vandoninck) is directed to a device for generating fog.

U.S. Pat. No. 4,841,752 (Fletcher) is directed to robbery deterrent apparatus. In the Fletcher patent, a plurality of nozzles dispense a disabling fluid chemical upon activation of a control valve by the foot pedal and cash register positioned switch.

U.S. Pat. No. 5,703,563 (Abe Jr.) is directed to an anti-hijack system for an automobile. In the Abe Jr. patent, spray nozzles are in the window well of the front windshield of a car in such a manner that the spray impinges upon a person outside the vehicle and in vicinity of the driver's door.

U.S. Pat. No. 5,182,541 (Bajorek) is directed to a remote controlled theft deterrent system.

SUMMARY OF INVENTION

The prior art directed to robbery deterrent systems, and anti car-jacking devices is not well adapted to anti-terrorist activities aboard an airplane. Accordingly, this invention is directed to method and system for countering hijacking attempts by activating chemical spray systems, fogging systems, laser guns, and alarm systems. More specifically, this patent application comprises remotely activating and remotely controlling the different anti-hijacking modalities, by use of a customized wireless transmitter sending encoded radio-frequency signals. It can also be used for communication.

In one aspect of the invention, the wireless remote can activate and control each of the modalities by pressing a code or sequences of codes.

In another aspect of the invention, the remote operation can be performed in combination or sequentially. For delayed onset of defense system a predetermined program sequence can be pre-programmed, if required.

In another aspect of the invention, the remote has communication capabilities between the cockpit and cabin crew, security personnel and ground operations.

In another aspect of the invention, laser guns which are strategically pointed behind the cockpit door (and other areas in the cabin), can be selectively used by the remote activation device, by appropriate personnel and under appropriate conditions.

In successfully defending against a terrorist attack it is imperative that multiple modalities are available to the defending team to choose from, and that these modalities can function selectively, or simultaneously, or sequentially. For example, fogging can be used with laser guns, or spraying aerosol chemicals and fogging can be used in combination. As each hostile situation is different in intensity and terrorist's abilities, an adequate defense system requires surprise element and flexibility of operation.

BRIEF DESCRIPTION OF THE DRAWINGS

For the purpose of illustrating the invention, there are shown in the accompanying drawings forms which are presently preferred; it being understood that the invention is not intended to be limited to the precise arrangements and instrumentalities shown.

DESCRIPTION OF THE INVENTION

The current invention describes a method and system for foiling/countering hostile attempts with various modalities, ranging from simple alarm sounding systems to the more complex various types of chemical spray system built into the aircraft, and laser guns outside the cockpit door. Any of the modalities described in this patent application may be used by itself or in any combination. Any of these systems may also be activated in any combination, by a small, easy to carry, customized wireless activation transmitter system.

For practicing the method and system of this invention, under extremely serious situations such as hostile activity aboard the aircraft, an appropriate person from the flight crew is able to activate a system, where upon pressing an appropriate button from the cockpit is able to activate one of the anti-hijacking defense systems.

Figure 1:
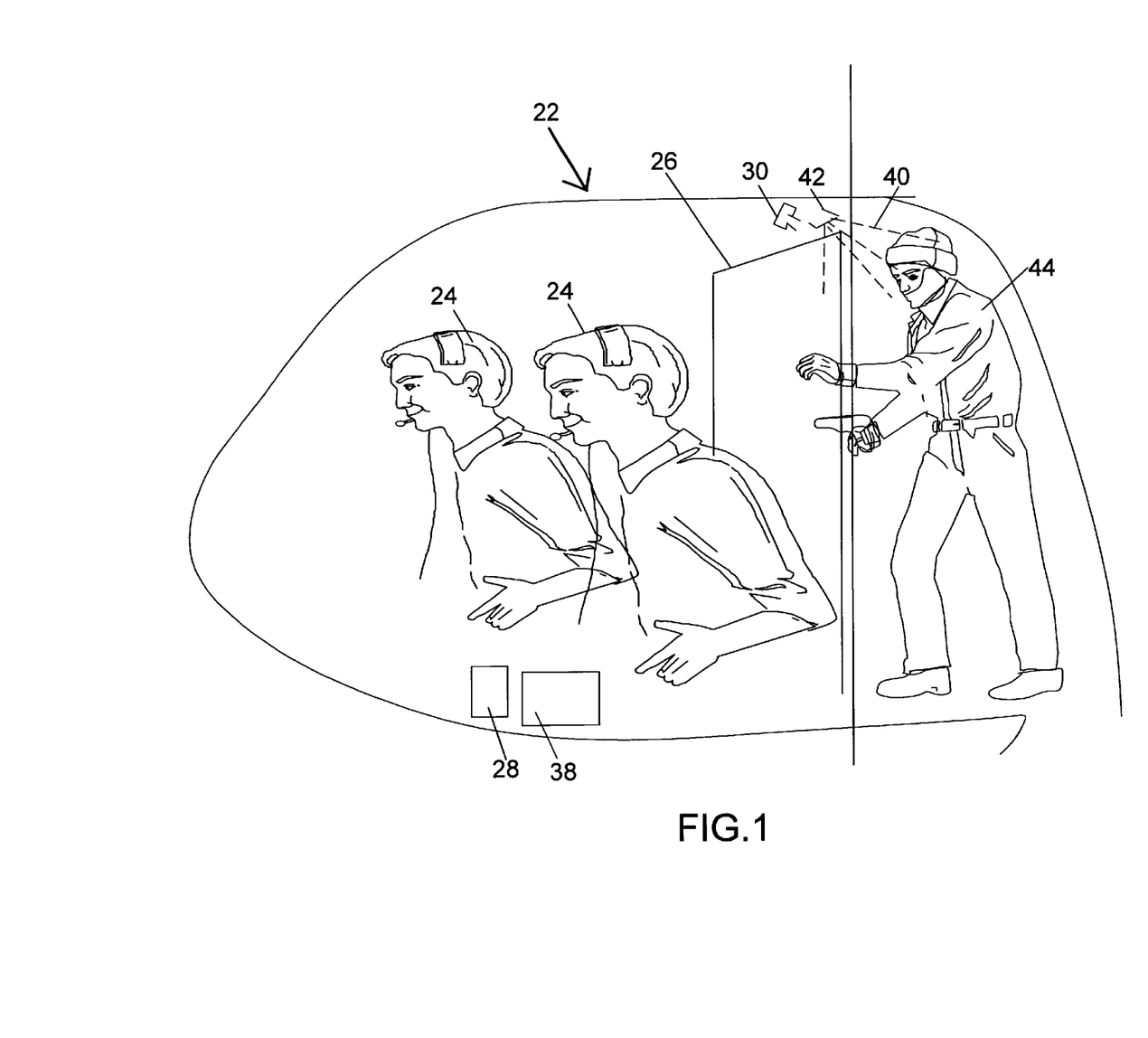
FIG. 1 is a schematic diagram showing fight crew in the cockpit and hijacker outside the cockpit door.
Figure 2A:
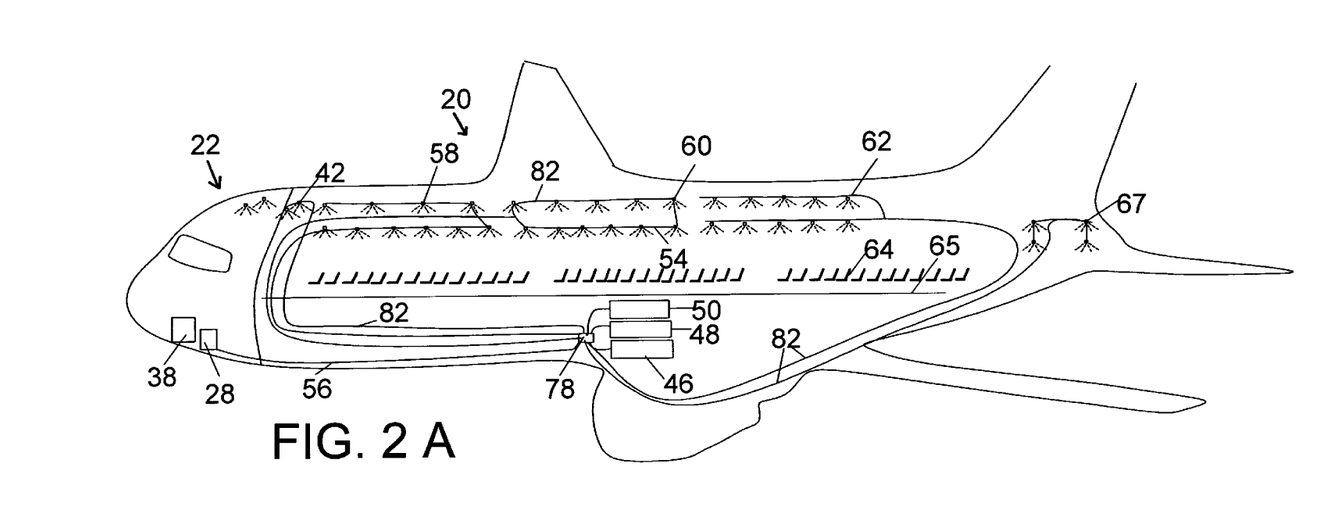
FIG. 2A is a schematic diagram of an airplane showing spray nozzles and cylinders.
Figure 2B:
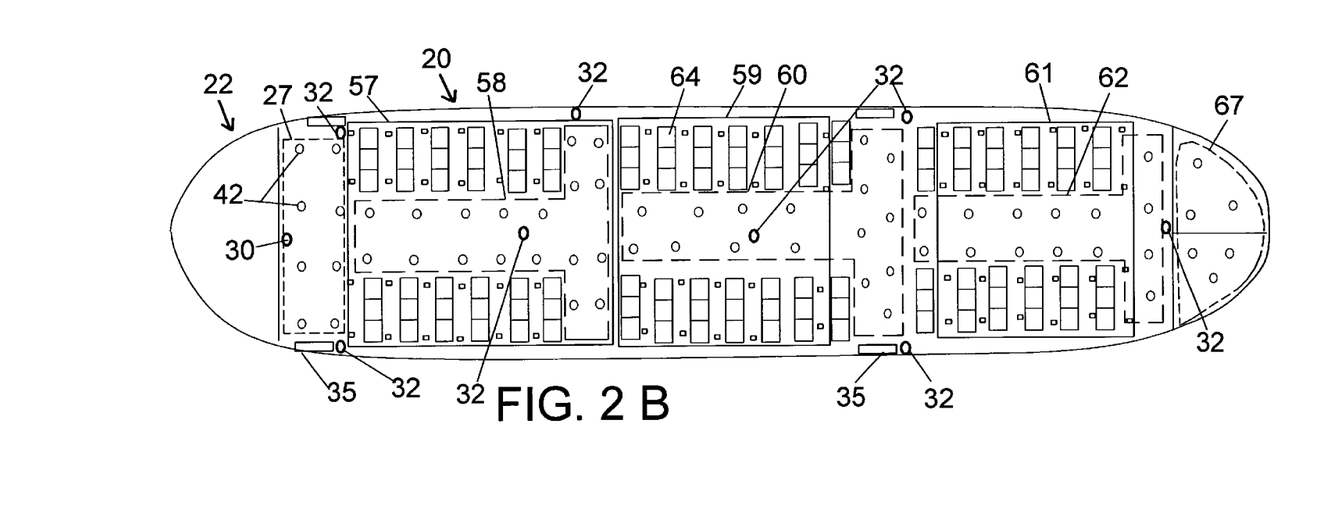
FIG. 2B is a schematic diagram (top-view) of an airplane showing location of spray nozzles.

As shown schematically in FIG. 1, in one embodiment of practicing this invention, cameras 30 are located strategically outside the cockpit door (and other cameras 32 in the cabin) enable the cockpit crew 24 to have a view of the passenger cabin area 20. Upon sensing danger, the pilot 24 or another member of the cockpit crew 24, can quickly look into the cabin from the monitor 38 by zooming onto the appropriate camera from the control panel 28, to get a look at the target individuals. If the captain senses danger, appropriate individuals from the flight crew are able to put on the gas masks and turn "on" the chemical spray from the spray nozzle(s) 42 strategically located outside the cabin door 26. As shown in FIGS. 2A and 2B, the spray outlet nozzles are strategically located overhead behind the cockpit door area 27 and in the cabin 20. For the purposes of dispensing the chemicals, the spray nozzles are broken down into sections, such that the chemicals can be dispensed to selected areas of the plane independently. Therefore with the aid of the cameras, a captain (or crew member) may activate only the area behind the cockpit door 27, or one or multiple sections of the cabin 20, without leaving the cockpit. Upon activation, the camera images can also be recorded on the airplane's flight recorder and/or the "black box".

Since the aim is to temporarily render the hijackers non-functional or dysfunctional, various choices of aerosol chemicals spray, from very benign to very potent chemical are available. Four broad categories of aerosol chemicals can be used for practicing the methods of this invention. The most benign category is smoke or fogging agents, which work by visually blocking an area or sections of the airplane. Other more potent categories are inhalants, general anesthetics, and irritants.

Inhalants, which include a wide variety of breathable chemicals produce mind-altering results. Effects of inhalants varies from one substance to another. One advantage of inhalants is that their effects are felt virtually immediately. The duration of effects depends on the substance used. Effects can last from just a few seconds for some, and up to several hours for others. Persons under the influence of inhalants will get confused and disoriented, and their speech will get slurred.

Low doses of gaseous anesthetic agents may also be used singly, or in combination. The effects of these agents are well understood because of their use in medicine and surgery. Commonly used inhaled anesthetic agents are nitrous oxide (also known as laughing gas), halothane, sevoflurane, desflurane, and isoflurane. Halothane and sevoflurane are the easiest to inhale. Nitrous oxide has the advantage that when used alone is not potent enough to be a complete general anesthetic. When the anesthetic gas is inhaled into the lungs, the blood that travels through the lungs carries the anesthetic gas to the central nervous system. The rate at which the bloodstream takes up the anesthetic is dependent on may factors including the concentration of the inspired gas, the rate of flow of the gas, the solubility of the gas in blood, the rate and depth of breathing, and the amount blood the heart pumps each minute.

Among the anesthetic agents, halothane (chemical name 2-bromo-2-chloro-1,1,1-trifluroethane) is a colorless, mobile fluid, $C_2HBrClF_3$, and has chloroform odor and a sweet taste. Sevoflurane with chemical name fluromethyl-2,2,2-trifuluoro-1-(trifluromethyl) ethyl ether has the chemical formula of, $C_4H_3F_7O$. Nitrous oxide (chemical formula $N_2O$) for example, is a colorless gas, having a sweetish taste and a pleasant odor and is normally used as a general anesthetic or analgesic agent.

In the irritants category, a host of non-lethal chemicals such as mace, pepper sprays, and tear gases can be used. These agents have extensive experience from crime prevention and crowd control during civil disturbance.

The intent of any such aerosol chemical used would be to temporarily debilitate and render the individuals non-functional who come in contact with such chemicals, without causing permanent or long lasting damage. Therefore the concentration, dose, flow rate, and time of spray would have to factored.

An example of tear gas is a compound known as CS, chemical name Orthochlorobenzylidenemalononitrile $ClC_6H_4CHCCN$ $(CN)_2$. It is a blue colored synthetic agent which has the state of micro-particulate solid and is classified as irritant, lacrimator, sternutator. It produces irritation of the skin, tearing and lacrimation, sneezing, and irritation of the respiratory system. It takes effect in about 3 to 10 seconds, and recovery takes about 10 minutes. Since it is made of solid particles, it must be carried through the air by an agent or expelled in a fine dust. Its odor is rather pungent. CS is most irritating in a humid climate and on a moist skin surface. Anyone who has lost his sense of feeling because of the influence of narcotics or alcohol will not be affected by CS. Other pepper sprays with various concentration of Capasicin (the active ingredient) can also be used.

Yet another non-lethal agent being developed at the Sandia National Laboratory in Alburquerque, New Mexico, known as sticky foam can be used. This foam is so sticky that it can literally stop a suspect in his tracks.

The benign gaseous agents which mearly fog up vision, can be used alone or in conjunction with other deterrents such as burglar alarm type of modalities.

The aerosol content supply of chemicals are appropriately pressurized in cylinders and stored in convenient locations aboard the airplane. The control panel of such a system being located in an appropriate place within the cockpit. The pilot or a member of the flight crew is also able to engage the control panel from anywhere within the aircraft using a wireless transmitter as described later in this application.

As shown in FIG. 2A, cylinders 46, 48, 50 containing the aerosol chemicals are stored in appropriate location within the airplane. Upon activation from the control panel 28 or wireless transmitter 100, regulator valves allow the gas, or combination of gases flow via tubes to the pumping system 66 and then to the spray nozzles 42, 58, 60, 62.

As shown in the FIG. 2B (top view) the spraying action in the airplane is divided into sections, for example front 58 &57, middle 60 & 61, and back 62 & 61. Further sections divided into aisle and standing areas like 60, 62, and 64 and bathrooms 67. The purpose of sectional divisions is to be able to selectively spray only areas of hostile activity. However, if the whole airplane needs to be fogged or chemically sprayed, that can also be done. Each section can be activated alone, or with other sections simultaneously. Camera(s) 30 which are located outside the cockpit door area 27 and cabin cameras 32 are located in the passenger areas to view these areas on the monitor 38 for deciding which section to spray.

Figure 3:
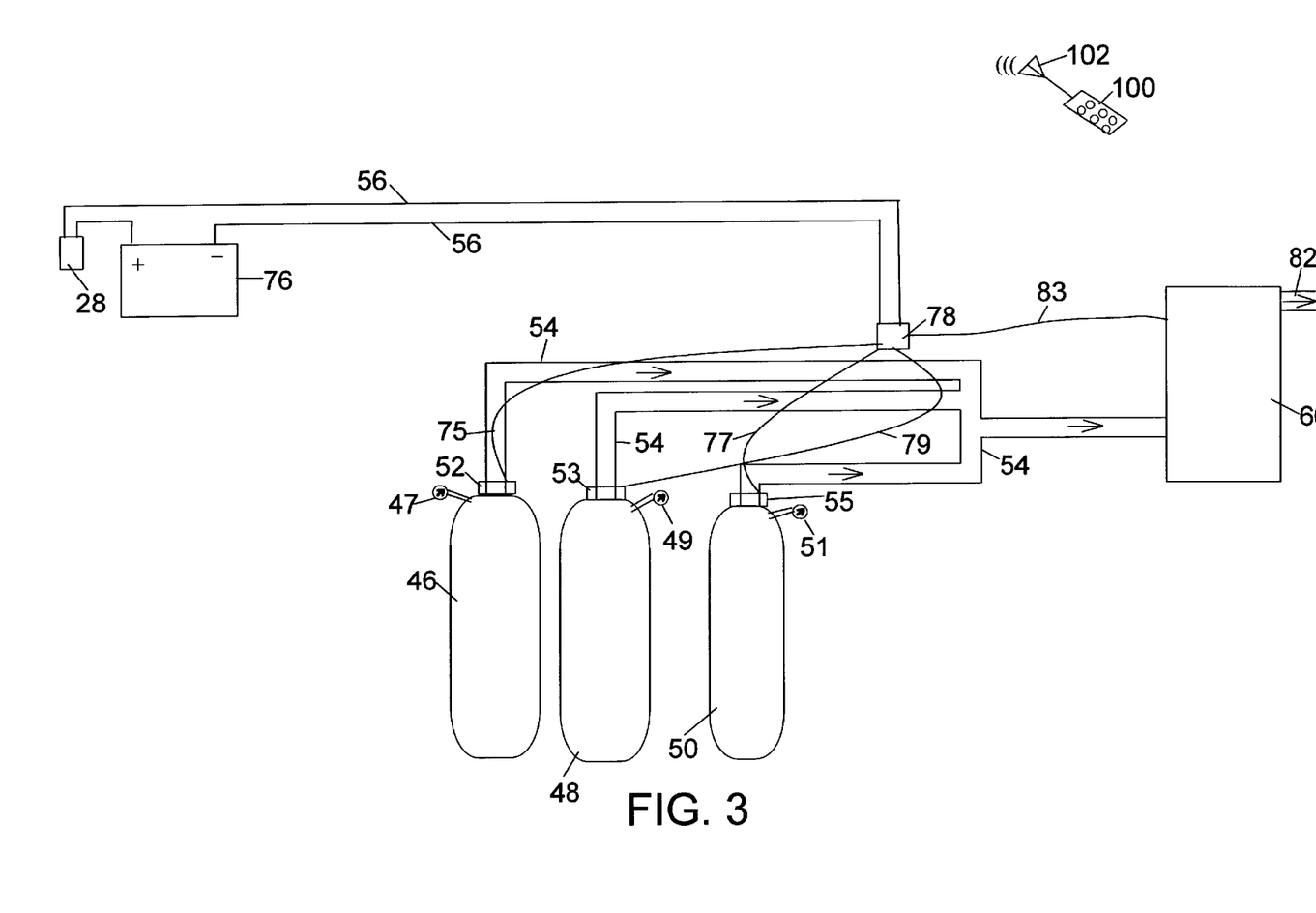
FIG. 3 is a schematic diagram showing the storage and delivery system of the chemicals.

As shown in FIG. 3, the non-lethal incapacitating agents are stored in pressurized containers 46, 48, 50 and are prevented from discharging by solenoid valves 52, 53, 55. Connected to the fluid output of solenoid valves 52, 53, 55 are distribution manifolds 54, which is in communication with discharge manifolds 56. Once solenoid valves 52, 53, 55 are opened, either from the control panel 28 in the cockpit 22 or from the wireless transmitter 100, appropriate chemical agents fill discharge manifolds 56 via distribution manifolds 54 and are dispersed in a predetermined pattern through nozzles distributed within the plane, to effect the individuals standing inside the region defined by the predetermined pattern. The regulation of quantity (flow rate x time) is at the level of control valves 52, 53, 55 from the cylinders 46, 48, 50. The pressure of flow is controlled via pump 66

Pressure monitoring devices 47, 49, 51 (comprising solid-state pressure sensor) monitor pressure in the containers 46, 48, 50. In the event, the pressure in any of the containers 46, 48, 50, goes out of range, appropriate indicators will be lighted on the control panel 28 in the cockpit.

Figure 4:
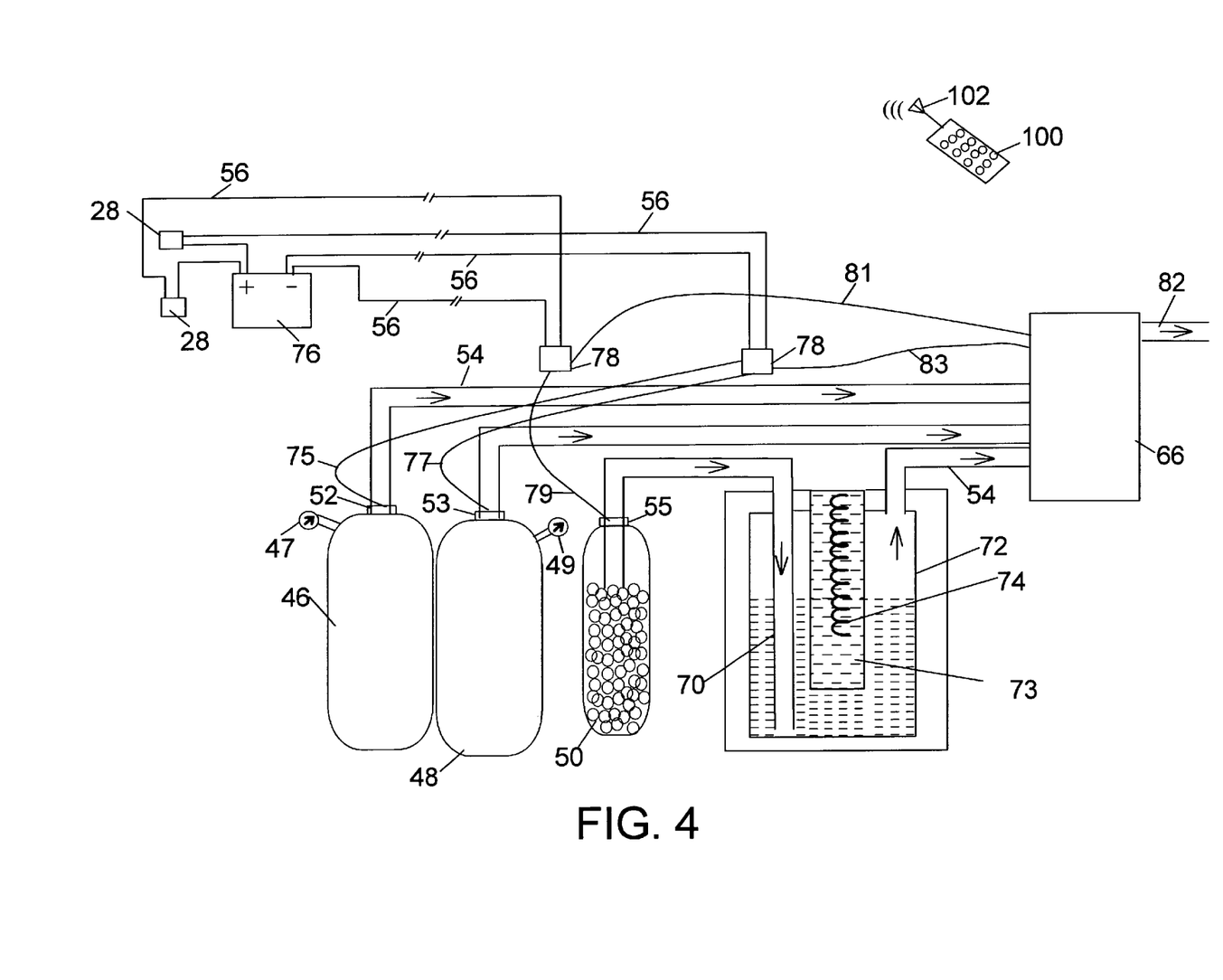
FIG. 4 is a schematic diagram showing the storage and delivery system for smoke and fog.

In one embodiment of the invention, fog can be generated outside the cockpit door (and in the cabin). As shown in FIG. 4, a first vessel 50 is kept at a first temperature and filled with an alcohol mixture. An alcohol mixture comprising approximately 50% propylene, 30% triethylene glycol, and 20% water can be used. A second vessel 72 having a heat exchanger 74 for keeping the second vessel at a higher temperature than the first vessel. The pipe 70 connecting the two vessels has a valve 78 mounted for opening the connection between the first vessel 50 and the second vessel 72. The oil bath 73 and heating element 74 can quickly generate fog, thus distributing the fog under pressure into the area behind the cockpit door, or other areas. The valve 78 can be activated from the control panel 28 in the cockpit 22, or via a wireless transmitter 100 anywhere in the plane 20. A backup battery 76 ensures continuous uninterrupted power supply.

Figure 5A:
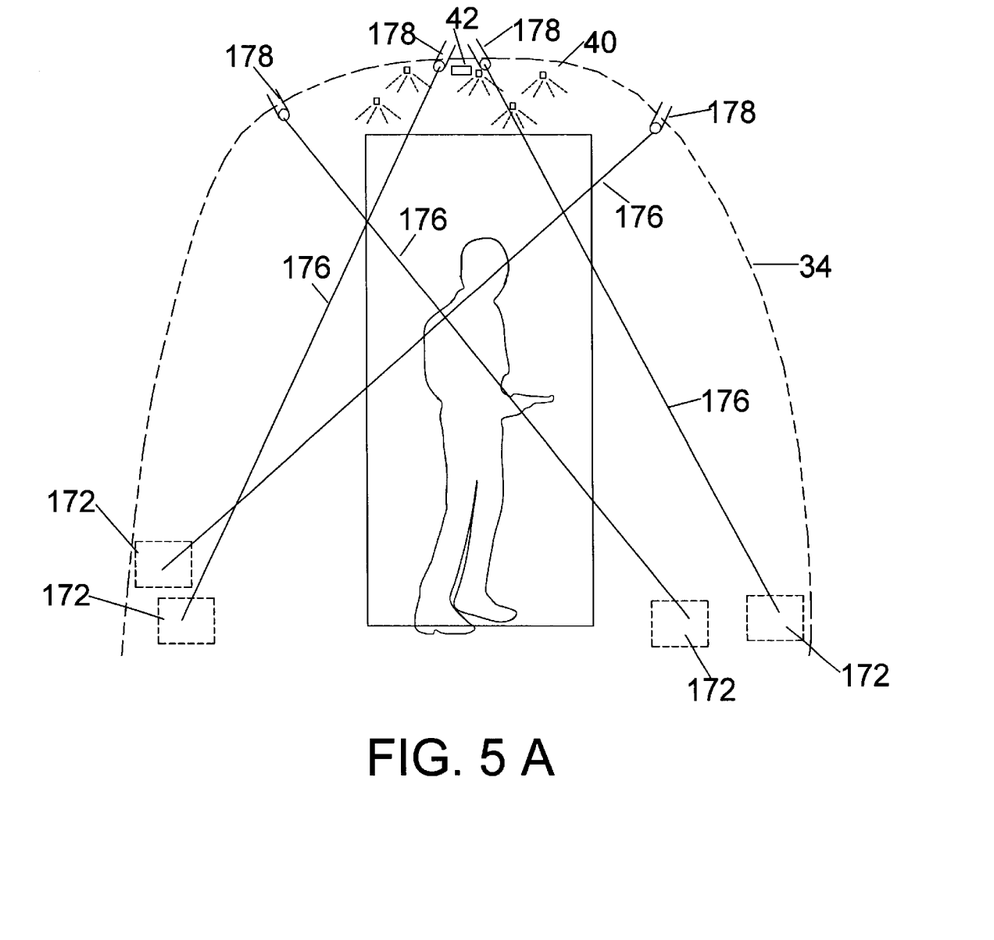
FIG. 5A is a schematic diagram showing the position of laser beams behind the cockpit door.
Figure 5B:
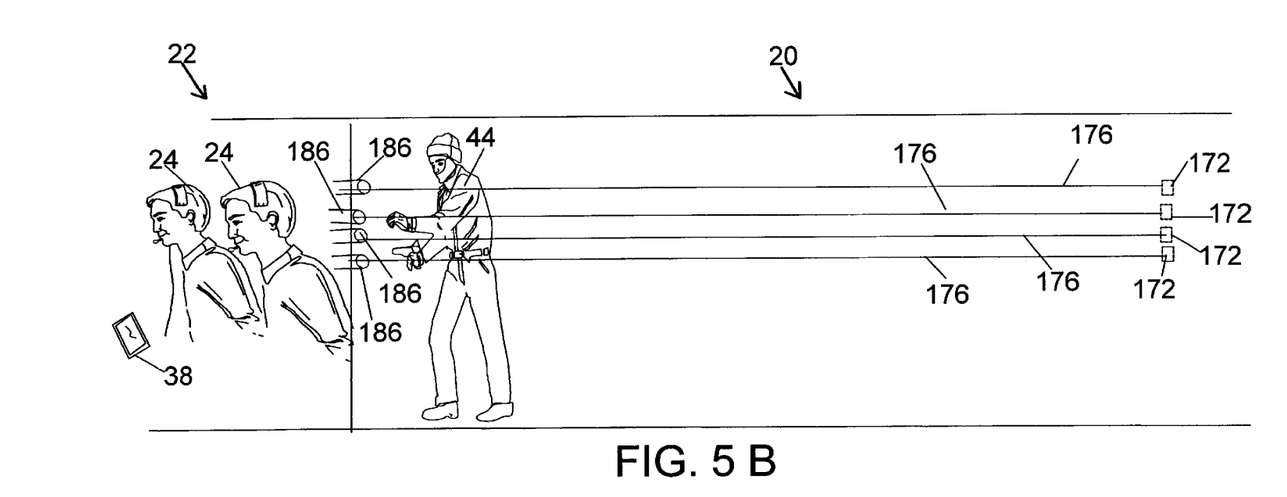
FIG. 5B is a schematic side-view diagram showing the position of laser beams covering the aisle area in an airplane.
Figure 5C:
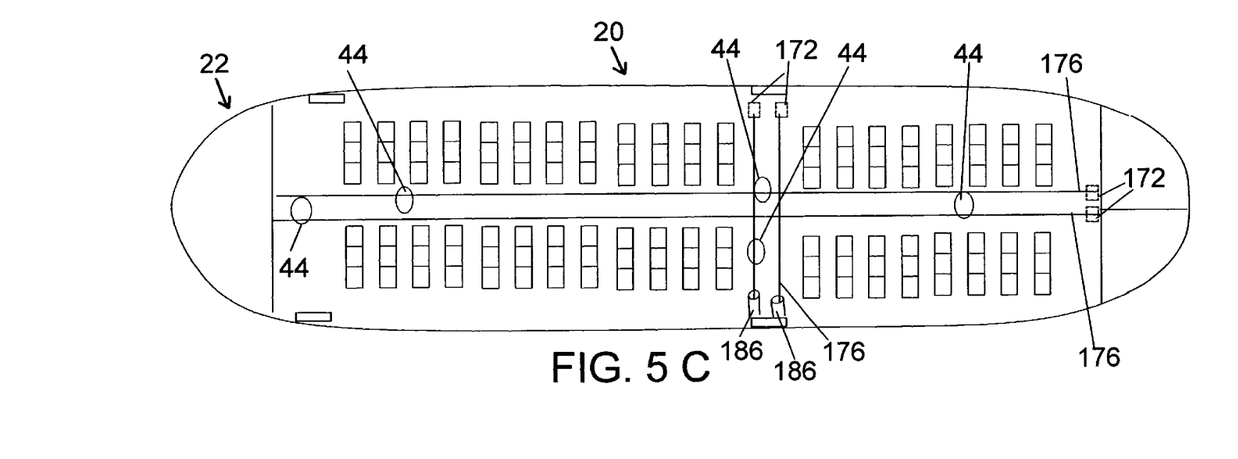
FIG. 5C is a schematic top-view diagram showing the position of laser beams covering the aisle area in an airplane.

In another line of defense, laser guns are used separately, or in conjunction with chemical sprays. As shown in FIG. 5A, laser guns 178 can be strategically pointed in the area 27 behind the cockpit door. Laser guns 186 can also be pointed in the aisle, and at a level higher than the seats, as is shown in FIG. 5B. These could be used in the event that only the hijackers are standing in the aisle, and the passengers are seated. There are protective reinforced areas 172 placed in the line of the laser beam 176, to prevent damage to the airplane. Of course, the level of control and password protection would be the highest. These laser guns 178, 186 can be activated via the security control panel 28 or via wireless transmitter 100. These laser guns 130 can also be used in conjunction with the above mentioned fog system or any other aerosol chemicals. The activation and use of the laser guns would be most appropriate for a plain cloth security marshal, if one is on-board during such an extreme event.

Figure 6:
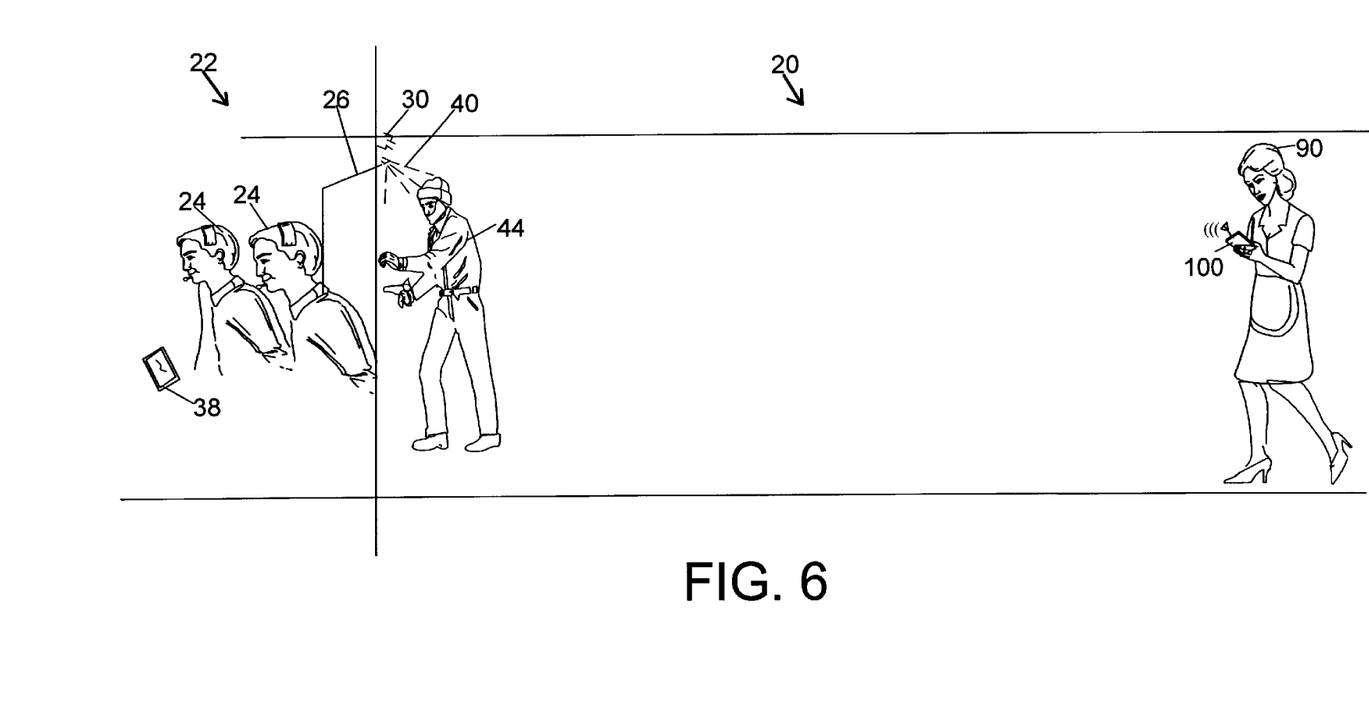
FIG. 6, is a schematic diagram showing a flight attendant carrying a wireless activation device.
Figure 7:
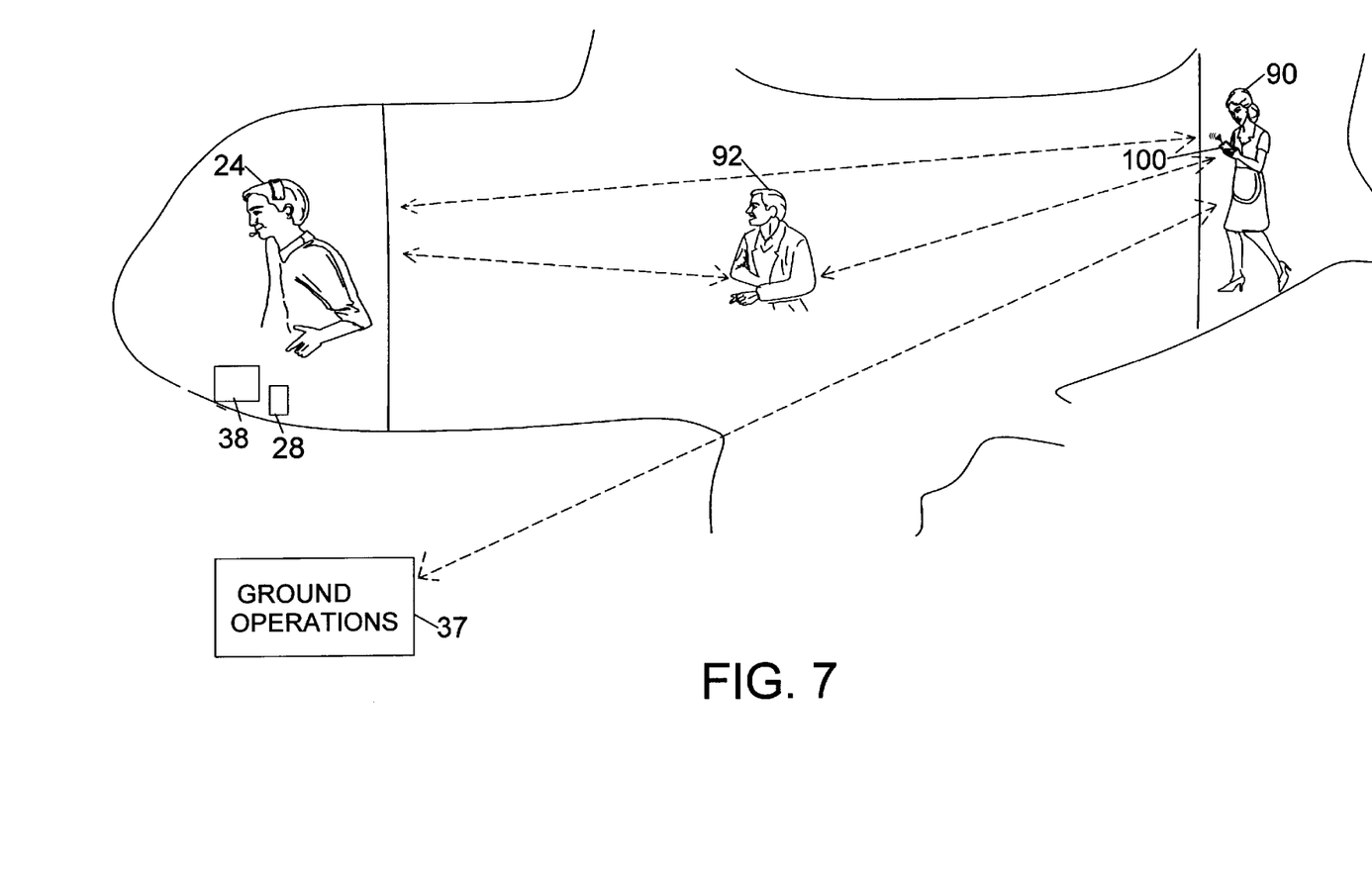
FIG. 7 is a diagram showing three-way communication with a wireless activation and communication device.

In all the above embodiments, a small wireless transmitter can also be used for activation of any modality or a combination of modalities. As shown in FIG. 6, a flight attendant is able to wirelessly either communicate with the crew in the cockpit 22, or under severe conditions is able to activate certain anti-hijacking measures. As shown in FIG. 7, a two-way or three-way communication is possible with the wireless transmitter 100. For example, as is schematically depicted, a flight attendant, through encoded messages, would simultaneously be able to alert a plain clothes air marshal 92 (if one is present), pilot 24, and ground operations 37 in the event of a hijacking or a security threat.

Figure 8:
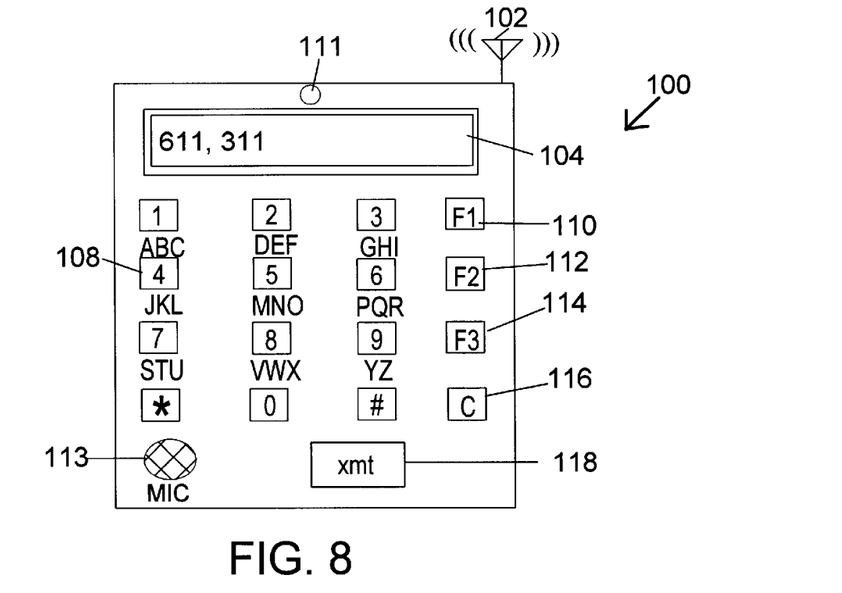
FIG. 8 is a schematic diagram showing close-up of wireless activation transmitter.

A diagram of the wireless activation system is shown in FIG. 8. The wireless transmitter 100 which looks like a tiny calculator in appearance, is a customized, sophisticated communication and remote activation system. Because of its small size, it can easily be concealed in the clothing pocket or in a handbag. The microprocessor based circuitry of the transmitter is adapted such that encoded messages activate appropriate responses. For example, by pressing a predetermined sequence of numbers an appropriate response is activated.

As one example by pressing a predetermined sequence of numbers, a message is activated at the control tower and ground operation that a serious situation (such as hijacking) is in progress. As another example by pressing another predetermined sequence of numbers, a message is activated to the crew in the cockpit that a serious situation (such as hijacking) is in progress. As another example by pressing another predetermined sequence of numbers, a sound alarm system can be activated much like a burglar alarm system in a car. The purpose of such a sound message or alarm would be to startle the hijackers or make their communication process more difficult. The length of the audio message or alarm can be pre-programmed to any length or loudness. Other security systems can also be operated from the wireless transmitter 100.

The presently preferred embodiment, as shown in FIG. 8, has a small liquid crystal display (LCD) screen, where the encoded messages appear. An example of an encoded message may be 811 or 611,211,311. Upon pressing the transmit (XMT) 118 key, an action or a series of actions are securely and reliably activated. Regular keys 108 and several special function keys 110,112,114,116, are used for encoding messages and activation sequences.

Figure 9:
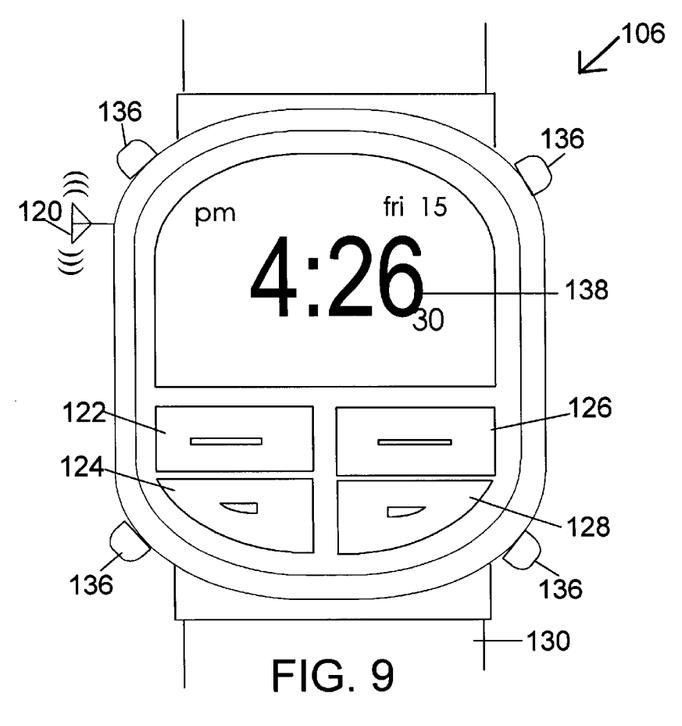
FIG. 9 is diagram showing wireless transmitter incorporated within a wristwatch.

The wireless capability and functionality of the transmitter 100 is also incorporated into a watch-size transmitter 106, as shown in FIG. 9. A series of buttons located on the front and sides of the "watch" 106 are used for encoding the activation of various systems and events.

Figure 10:
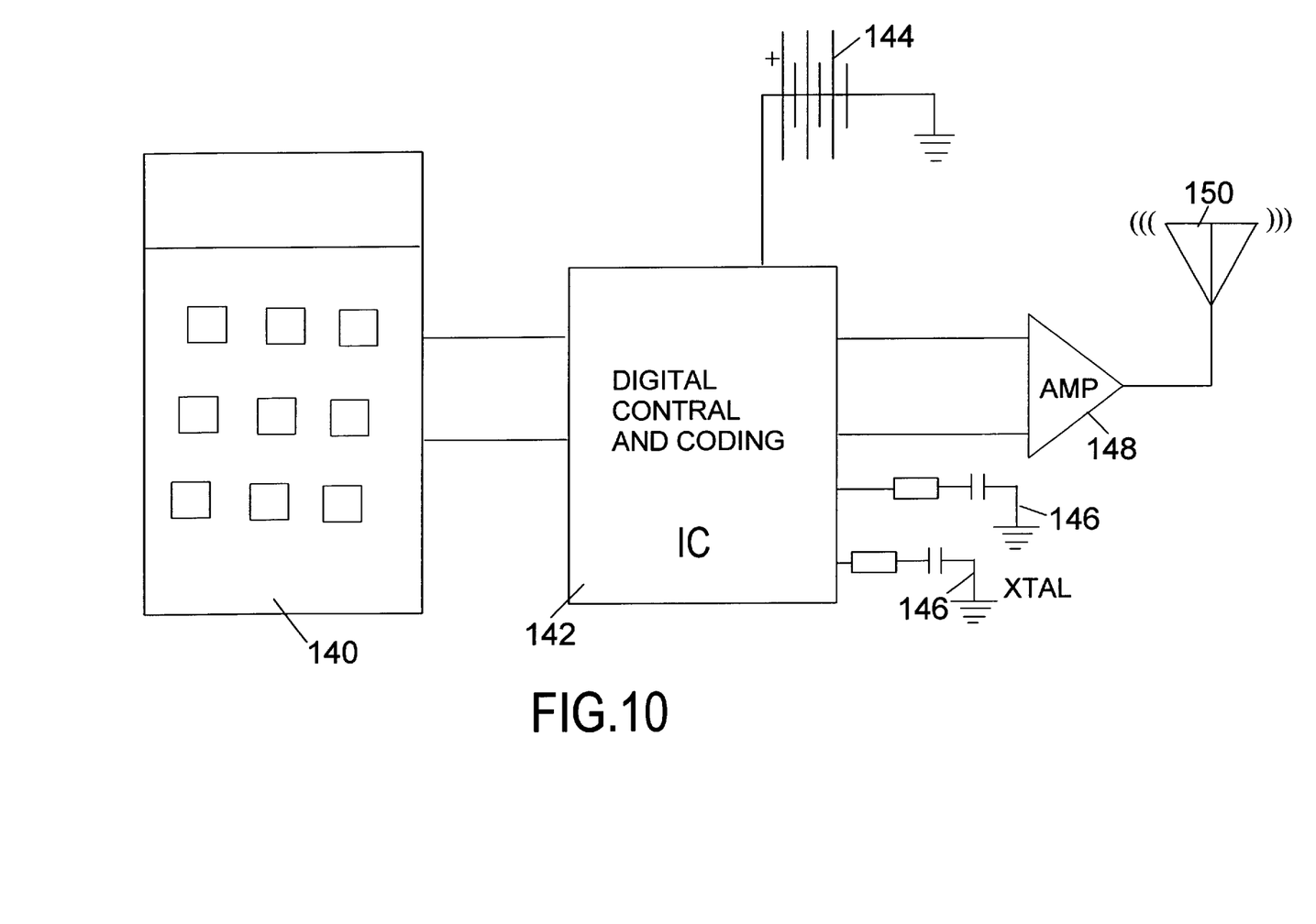
FIG. 10 is a general schematic block diagram of the wireless transmitter.

A simplified schematic diagram of the wireless transmitter 100 is shown in FIG. 10. Input to the control circuitry 142 is provided by a keypad 140. The output is coded high frequency signals, which are amplified 148, and transmitted via a small antenna 150. Clock signals are provided by crystal oscillator 146 and power to all components is provided by a battery 144.

Figure 11:
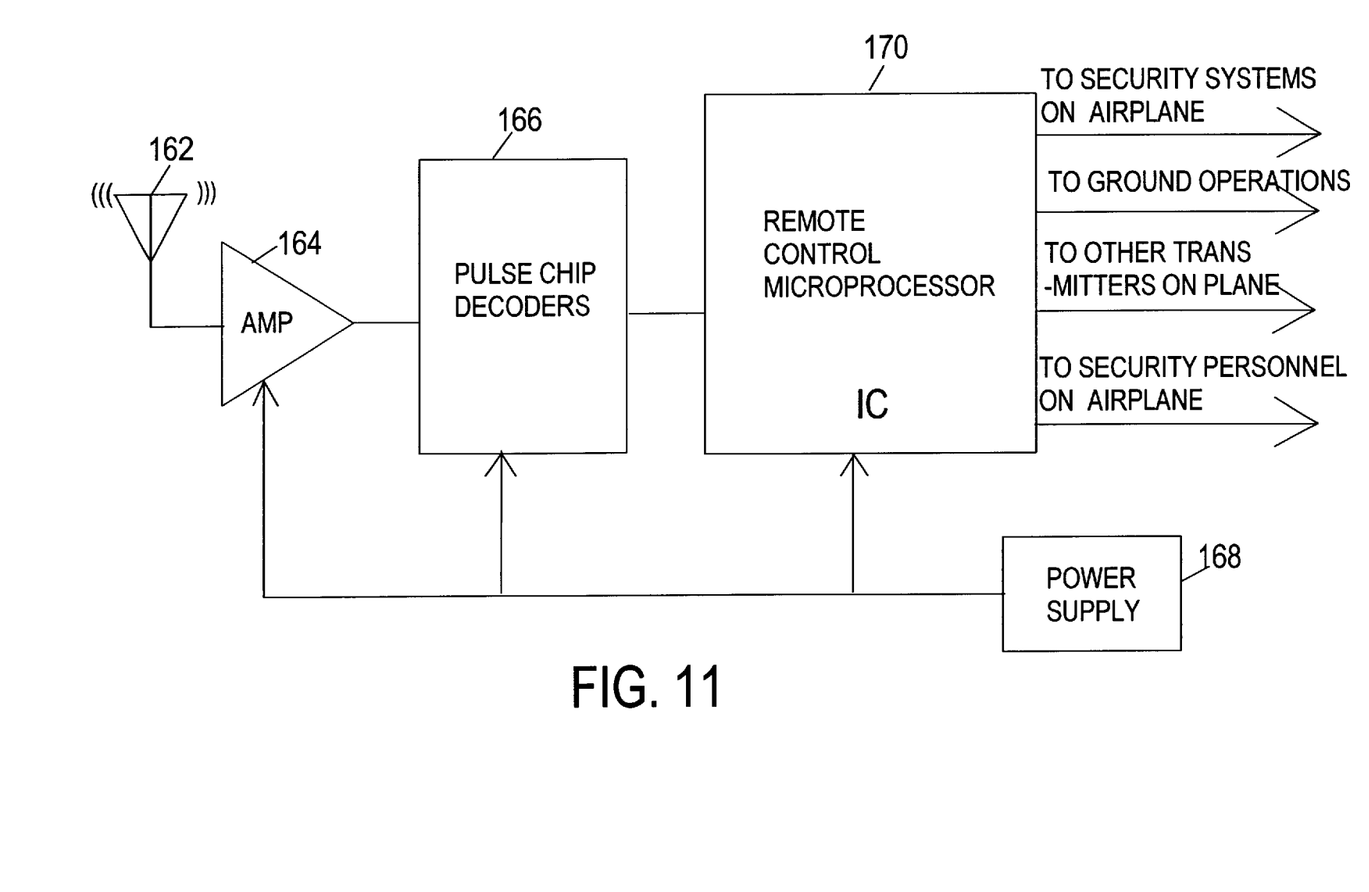
FIG. 11 is a general schematic block diagram of the wireless receiver.

As shown in FIG. 11, an antenna 162 on the receiver side receives these encoded radiofrequency pulses, which are amplified 164 and decoded 166. The main receiver and circuitry being located at the control panel 28 in the cockpit. Microprocessor circuitry 170 deciphers and routes the action of the pulses. For example, a higher level encoded security message would automatically be transmitted from the control panel 28 of the airplane to ground operations 37, and simultaneously any other additional measures would also be activated.

The activation transmitter is password and code protected with software lockouts. For example a security marshal on the plane will have access to turn on laser guns, whereas a flight attendant will have a more limited access to security defense systems Although certain preferred embodiments and methods have been disclosed herein, it will be apparent from the foregoing disclosure to those skilled in the art that variations and modifications of such embodiments and methods may be made without departing from the true spirit and scope of the invention. Accordingly, it is intended that the invention shall be limited only to the extent required by the appended claims and the rules and principles of applicable law.

We claim:

1. A system for wireless remote activation and control of anti-hijacking systems, wherein at least one person has complete access for activation and control, and at least one different person only has partial access for activation and control of said systems installed aboard an aircraft, comprising:
   a) anti-hijacking systems installed aboard said aircraft, wherein said anti-hijacking systems comprise at least one of system for releasing gases, releasing chemical sprays, releasing fog, releasing spray of sticky glue, firing laser guns or sounding at alarms different selective areas, with activation and control from any location in the aircraft;
   b) portable transmitter means, wherein said transmitter means sending encoded radiofrequency signals from within said aircraft;
   c) receiving means connected to each of said anti-hijacking system, wherein said receiving means adapted to communicate with said transmitter means;
   d) de-coding means for said encoded radiofrequency signals from said transmitter means; and
   e) control means adapted to said anti-hijacking systems, wherein said received decoded signals activate, control parameters of said anti-hijacking systems.

2. The system of claim 1, wherein at least two of said anti-hijacking systems are adapted to be activated simultaneously by said wireless communication system.

3. The system of claim 1, wherein at least two of said anti-hijacking systems are adapted to be activated sequentially by said wireless communication system.

4. The system of claim 1, wherein said wireless remote activation and control system further comprises means for communication with operations on the ground.

5. A method of wireless remote activation and control of anti-hijacking systems, wherein at least one person has complete access for activation and control, and at least one different person only has partial access for activation and control of said systems installed aboard an aircraft, comprising:
   a) providing said anti-hijacking systems installed aboard said aircraft, wherein said anti-hijacking systems comprise at least one of releasing gases, releasing chemical sprays, fogging, spraying sticky glue, firing laser guns or sounding alarms at different selective areas, with activation and control from any location in the aircraft;
   b) providing portable transmitter means, wherein said transmitter means sending encoded radiofrequency signals from within said aircraft;
   c) providing receiving means connected to each of said anti-hijacking systems;
   d) providing de-coding means for said encoded radiofrequency signals from said transmitter; and
   e) providing control means adapted for said anti-hijacking measures, wherein said received decoded signals activate, control parameters of said anti-hijacking system.

6. The method of claim 5, wherein activation of said anti-hijacking system further alerts operation on the ground.

7. The method of claim 5, wherein at least two of said anti-hijacking systems are activated simultaneously by said wireless remote system.

8. The method of claim 5, wherein at least two of said anti-hijacking systems are operated remotely according to a program sequence.

9. The method of claim 5, wherein said remote communication system has communication capabilities with ground operations.

* * * * *